United States Patent Office 3,296,119
Patented Jan. 3, 1967

3,296,119
CATALYTIC REFORMING PROCESS AND
CATALYST THEREFOR
Edward J. Bicek, La Grange, Ill., assignor to Universal Oil Products Company, Des Plaines, Ill., a corporation of Delaware
No Drawing. Filed Jan. 8, 1964, Ser. No. 336,365
13 Claims. (Cl. 208—139)

The present application is a continuation-in-part of my copending application, Serial Number 267,800 filed March 25, 1963, now abandoned, all the teachings of which are incorporated herein by specific reference thereto. The invention described herein encompasses a catalytic composite prepared in a manner which makes it particularly adaptable for use in a process for the reforming of hydrocarbons, hydrocarbon mixtures or fractions, and various hydrocarbon distillates.

More specifically, the present invention affords an improvement in a process for the catalytic reforming of hydrocarbons, through the utilization of a particular, novel catalytic composite which has been manufactured by a specific method of preparation. The catalyst is a composite of an alumina-containing refractory inorganic oxide, combined halogen and a reduced noble metal from Group VIII of the Periodic Table having adsorbed thereon a monolayer of sulfur.

Catalytic reforming processes have attained extensive commercial utility among industries including the chemical, petrochemical, and particularly within the petroleum industry, etc. These reforming processes involve a multitude of reactions among which are hydrogenation, cyclization, cracking, dehydrogenation, alkylation, hydrocracking and isomerization. In particular instances, under certain specified conditions of operation, the catalytic reforming process may be tailored to effect a single reaction or a particular combination of two or more of the aforementioned reactions, at least in part dependent upon the characteristics of the charge stock. Whatever the particular industry and/or the particular reactions to be effected, it is extremely essential for commercial acceptance that the catalyst employed therein possesses a high degree of activity and selectivity, as well as prolonged capability to perform its intended function. For example, as encountered within the petroleum industry, the catalytic reforming of hydrocarbons and various mixtures of hydrocarbons involves three principal reactions, in addition to other concomitant reactions which occur to a somewhat lesser extent. In a process for the catalytic reforming of gasoline boiling range hydrocarbons, either for the purpose of enhancing the anti-knock characteristics thereof, or to produce an aromatic-rich hydrocarbon product, the primary objectives are to dehydrogenate the naphthenic hydrocarbons to produce aromatics, to dehydrocyclicize the straight-chain paraffinic hydrocarbons to form aromatics, and to effect a controlled degree of hydrocracking of long chain hydrocarbons, the latter being selective both with respect to the quality and quantity thereof. Also occurring, but to a somewhat lesser extent, are various reactions including isomerization, hydrogen transfer, disproportionation, etc. A successful catalytic reforming process is one which effects a proper balance among these reactions to achieve the desired end result, and is dependent to a great extent upon the particular catalytic composite employed to promote the various reactions.

Relatively recent developments within the petroleum industry have indicated that a catalytic reforming process is more advantageously effected through the utilization of a catalytic composite comprising at least one noble metal, or compound thereof, from Group VIII of the Periodic Table. Although the prior art abounds in a multitude of descriptions of such catalytic composites, and the methods employed for the manufacture thereof, the precise mechanism of catalysis, in regard to particular reactions and a particularly desired end result, is not fully understood, and the ultimate results of any process utilizing a particular catalyst are extremely difficult to predict with accuracy. In addition, various manufacturing procedures have been formulated for the purpose of developing catalytic composites which enhance the degree of activity and stability possessed by the particular catalytic composite while effecting the reforming of hydrocarbons. The ever-increasing demands for higher quality motor fuel, and aromatic concentrates, in greater quantities from a given charge stock, have necessitated the more stringent utilization of specific catalytic composites which have been manufactured by a particular method of preparation.

The object of the present invention is to improve a process for the catalytic reforming of hydrocarbons through the utilization of a particular catalytic composite which has been manufactured in accordance with a specific method of preparation. A related object of the present invention is to provide a procedure for the manufacture of a noble metal-containing catalyst having a degree of activity and stability, or capability to function for an extended period of time, which have heretofore not been obtained.

In a broad embodiment, the present invention relates to a hydrocarbon conversion catalyst comprising an alumina-containing refractory inorganic oxide, a reduced noble metal from Group VIII of the Periodic Table having a monolayer of sulfur adsorbed thereon, and combined halogen.

More specifically, the present invention encompasses a hydrocarbon conversion catalyst prepared by reducing an oxidized composite of alumina, from about 0.01% to about 2.0% by weight of platinum and from about 0.75% to about 1.5% by weight of combined chloride, and thereafter adsorbing sulfur onto the resulting reduced platinum; said conversion catalyst being further characterized in that the oxidized composite is reduced in an atmosphere of hydrogen at a temperature of from about 850° F. to about 1050° F., and said sulfur is adsorbed at a temperature of from about 50° F. to about 200° F.

The present invention also involves a method of manufacturing a catalytic composite of an alumina-containing refractory inorganic oxide, a noble metal from Group VIII of the Periodic Table and combined chlorine, which method comprises initially preparing a refractory inorganic oxide, combining said noble metal and chlorine therewith, drying the resultant composite and oxidizing the dried composite at an elevated temperature above about 400° F.; reducing the oxidized composite at a temperature within the range of from about 850° F. to about 1050° F., in an atmosphere of hydrogen, and thereafter adsorbing sulfur onto the resulting reduced noble metal at a temperature of from about 50° F. to about 200° F.

The hydrocarbon conversion catalyst hereinabove described affords particular advantages in a process for the catalytic reforming of hydrocarbons and mixtures of hydrocarbons. Therefore, the present invention offers an improvement in a process for reforming hydrocarbons and mixtures of hydrocarbons, in which process a hydrocarbon charge stock is contacted with a catalytic composite of a noble metal from Group VIII of the Periodic Table, a refractory inorganic oxide and combined halogen, which improvement comprises contacting said charge stock at reforming conditions, with a catalytic composite of alumina, reduced platinum in an amount of from about 0.01% to about 2.0% by weight and having sulfur adsorbed thereon in an amount of from about 0.05% to about 1.5% by weight, and combined chlorine in an amount of from about 0.75% to about 1.5% by weight, said catalytic composite characterized by the method of manufacture comprising initially preparing alumina, combining platinum and chlorine therewith, drying the resulting composite and oxidizing the dried composite at a temperature above about 400° F., reducing the oxidized composite in an atmosphere of hydrogen at a temperature within the range of from about 850° F. to about 1050° F., and thereafter adsorbing said sulfur onto the resulting reduced platinum at a temperature less than about 200° F.

From the foregoing embodiments, it will be noted that the reforming process encompassed by the present invention utilizes a catalytic composite of a refractory inorganic oxide, combined chlorine and a noble metal selected from Group VIII of the Periodic Table. It is recognized that the prior art relating to the catalytic reforming of hydrocarbons is replete with descriptions of a multitude of catalysts for utilization therein, and further that these catalysts consist essentially of halogen and one or more metals from Group VIII of the Periodic Table, composited with a carrier material comprising one or more refractory inorganic oxides. Furthermore, it is considered by the prior art that the halogen component may be selected from the group of fluorine, chlorine, bromine, and iodine. The use of halogen, in some combined form, with the other components of the catalytic composite, is known to impart a particular acid-acting function to the catalyst, whereby the same exhibits the propensity to be selective in the quality and quantity of hydrocracking which is effected. Notwithstanding that the various members of the halogen family are considered to be equivalent for the aforementioned purpose, and it is especially acknowledged within the prior art, that fluorine, chlorine and mixtures thereof are substantially equivalent, the particularly preferred catalytic composite manufactured in accordance with the present invention is a fluoride-free composite having combined chlorine as the sole halogen component. Although the chlorine is sometimes referred to herein as combined chloride, or combined chlorine, it is understood that the stated preferred concentration, within the range of from about 0.75% to about 1.5% by weight, is calculated on the basis of elemental chlorine.

As hereinabove set forth, the catalytic reforming process of the present invention utilizes a catalyst containing a noble metal component from Group VIII of the Periodic Table. Although the catalyst encompassed by the present invention is particularly directed toward the utilization of platinum, it is intended that the term "noble metal" include other Group VIII metals from the platinum-group, such as palladium, rhodium, ruthenium, osmium and iridium. It is understood that the benefits afforded to processes utilizing catalysts containing different noble metals are not equivalent, and that the effects of employing the method of the present invention with a particular metallic component or mixture of metallic components, are not necessarily the same effects observed with respect to other metallic components, or mixtures of other metallic components. Generally, the amount of the noble metal component combined with the other catalytic components is small; for example, platinum and/or palladium, will generally comprise from about 0.01% to about 5.0% by weight of the total catalyst, and more preferably from about 0.01% to about 2.0% by weight, calculated on the basis of the elemental metal. The use of the other noble metal components, with or without platinum, is at least partially dependent upon the utilization for which the particular catalytic composite is intended. In any case, however, the concentrations of the metallic components will be small, and generally in the range of from about 0.01% to about 2.0% by weight of the total catalytic composite.

Whatever the catalytically active metallic component, or components, it is generally composited with a refractory inorganic oxide carrier material such as alumina, silica, zirconia, magnesia, boria, thoria, titania, strontia, etc., and mixtures of two or more including silica-alumina, alumina-boria, silica-thoria, silica-alumina-zirconia, etc. It is understood that the refractory inorganic oxides thus described are intended to be illustrative rather than limiting upon the process of the present invention. It is further understood that these refractory inorganic oxides may be manufactured by any suitable method including separate, successive or coprecipitation means, or they may be naturally-occurring substances such as clays or earths which may or may not be purified or activated in accordance with a special treatment. The refractory inorganic oxide utilized as the carrier material for the catalyst of the present invention preferably comprises at least a portion of alumina, either in admixture with other of the aforementioned refractory oxides, or as the sole component of the carrier material. When utilized in the catalytic reforming of hydrocarbons and mixtures of hydrocarbons, for the purpose of producing higher quality motor fuel, or an aromatic-rich hydrocarbon product, it is further preferred that the carrier material comprise alumina as the sole component thereof. In the present specification and the appended claims, the term alumina is employed to mean porous aluminum oxide in all states of oxidation and in all states of hydration, as well as aluminum hydroxide. The alumina may be synthetically prepared or naturally-occurring, and may be of the crystalline or gel type. Whatever type of alumina is employed, it may be activated prior to use by one or more treatments including drying, calcining, steaming, etc. It may be in the form known as activated alumina, activated alumina of commerce, porous alumina, alumina gel, etc.

The alumina may be prepared by adding a suitable alkaline reagent such as ammonium hydroxide to a salt of aluminum such as aluminum chloride, aluminum nitrate, etc., in an amount to form aluminum hydroxide which, upon drying and a subsequent high-temperature calcination, is converted to alumina. The alumina may be formed into any desired shape including spheres, pills, extrudates, powder, granules, etc. The particularly preferred form of alumina is the sphere, and alumina spheres may be continuously manufactured by passing droplets of an alumina hydrosol into an oil bath maintained at an elevated temperature, the droplets being retained in said oil bath until they set to firm hydrogel spheroids. The spheres are continuously withdrawn from the oil bath and immediately thereafter subjected to specific aging treatments, in an ammoniacal solution, to impart the particularly desired physical characteristics thereto. Following the drying procedure, at a temperature of about 200° F. to about 210° F., to remove the greater proportion of excess moisture therefrom, the spheres are subjected to a calcination technique which appears to result in surface and structure characteristics rendering the alumina more susceptible to the thorough penetration and/or permanent deposition of the other catalytic components. The dried alumina is calcined initially at a temperature within the range of about 850° F. to about 1050° F. for a period of at least about one hour, and thereafter at an elevated temperature of about 1100° F. to about 1400° F., and for a time sufficient to decrease the volatile matter content of the calcined alumina to a level below about 2.0% by weight.

The halogen component, and, as hereinbefore set forth, preferably from about 0.75% to about 1.5% by weight of combined chloride, calculated as the element, may be added to the calcined alumina in any suitable manner, and either before or after the addition of the catalytically active metallic component, or simultaneously therewith. The chlorine may be added as an aqueous solution of hydrogen chloride, as aluminum chloride, or through the utilization of a volatile salt such as ammonium chloride. At least a portion of the chlorine may be composited with the alumina during the impregnation of the latter with the active metallic component, for example, through the utilization of chloroplatinic acid, chloropalladic acid, chloroplatinous acid, etc. Although the precise means by which the platinum component, or other noble metals from Group VIII of the Periodic Table, is incorporated with the other components of the catalyst, is not known, it is believed that the platinum exists as a chemical complex therewith, following the detailed calcination procedure hereinafter set forth. The method of preparing the catalyst is facilitated through the utilization of water-soluble compounds of the platinum group metals, with which the carrier material is combined via an impregnating technique. Thus, where the noble metal is platinum, it may be added to the carrier material by commingling the latter with an aqueous solution of chloroplatinic acid. Other water-soluble compounds of platinum may be utilized within the impregnating solution, and include ammonium chloroplatinate, platinous chloride, platinic chloride, dinitrito diamino platinum, etc. The utilization of a platinum-chlorine compound, such as chloroplatinic acid, is preferred since it facilitates the incorporation of both the platinum component and at least a minor quantity of the chlorine component in a single step. Hydrochloric acid may be employed in admixture with the chloroplatinic acid to incorporate the requisite quantity of combined chloride. Following the impregnating technique, the carrier material is dried and subjected to a particular high-temperature calcination, or oxidation, procedure as hereinafter set forth. Following the deposition of the chlorine and platinum component, the catalytic composite is dried at a temperature of about 200° F. to about 210° F. for the purpose of removing the excessive water remaining from the impregnating solution. Thereafter, the composite is oxidized, or calcined, initially at a temperature within the range of from about 400° F. to about 600° F. for a period of at least one hour, until the volatile matter content thereof is decreased to a level below about 5.0% by weight. The calcination temperature is then increased to a level within the range of about 700° F. to about 1000° F., and the composite is further calcined at the elevated temperature for an additional period of at least about one hour, until the volatile matter content of the final catalytic composite is decreased to a level below about 2.0% by weight, and preferably below about 1.5% by weight.

An essential feature of the present invention is the manufacturing procedure and technique employed following the oxidation of the catalytic composite, for example, a composite of alumina, platinum and combined chlorine. Although the method of the present invention, being primarily concerned with the treatment given the catalytic composite following the high-temperature oxidation, may be effected by disposing the catalyst on a moving belt, contacting the same as hereinafter set forth, or with the catalyst disposed as a moving-bed or fluidized-bed, it is particularly preferred that the catalytic composite be disposed as a fixed-bed in a suitable vessel. The fixed-bed treatment of the oxidized catalytic composite affords a more convenient and economical method of preparation, and, furthermore, the fixed-bed technique facilitates relatively simple control over the variables employed in the manufacturing procedure. A hydrogen-rich gas stream, preferably having a hydrogen concentration above about 99.0 mol percent, is passed through the catalyst maintained under a pressure within the range of from about atmospheric to about 100 pounds per square inch gauge. The hydrogen stream is continuously circulated through the catalyst at a temperature within the range of from about 850° F. to about 1050° F. and for a period of about one hour, until the platinum has been reduced to its lowest possible valence state.

The reduced platinum composite is cooled to a temperature within the range of about 50° F. to about 200° F., after which the circulation of hydrogen is stopped. As a safety precaution, it is preferred to have residual hydrogen purged from the system with a suitable inert gas such as nitrogen, until the off-gas stream indicates a hydrogen content below about 2.0%. Hydrogen sulfide is then passed through the reduced platinum composite at a temperature less than about 200° F. and preferably within the aforestated range, and at slightly above atmospheric pressure. The reduced composite is treated with hydrogen sulfide for a time sufficient to adsorb sulfur in an amount of from about 0.05% to about 1.5% by weight of the total composite. Where desired, the sulfiding technique may be effected by means other than through the use of a fixed-bed system. For example, the reduced platinum composite may be transferred to a rotating blender into which hydrogen sulfide is introduced in the desired amount. The catalyst and hydrogen sulfide are then blended for a period of about one hour, until a monolayer of sulfur has been adsorbed onto the catalyst.

It is recognized that the prior art contains various teachings of the incorporation of sulfur, or some compound thereof, within a catalyst intended for utilization in a catalytic reforming process. Such catalysts comprise platinum-group metallic components and halogen components composited with an alumina-containing refractory inorganic oxide. However, the prior art has not realized the unusual catalytic characteristics of a composite of which the sole halogen component is combined chlorine, and which has been subjected to a sulfiding technique at the low temperature of below about 200° F., and preferably at about room temperature of about 50° F. to about 100° F. The prior art continues to consider all the members of the halogen family of elements as being equivalent, and particularly chlorine and fluorine, and mixtures thereof. Furthermore, the sulfiding techniques of the prior art are conducted at elevated temperatures substantially greater than the maximum of about 200° F. as in accordance with the method encompassed by the present invention; for example, from about 500° F. to about 1000° F. or higher.

As in the method of the present invention, these high-temperature techniques of the prior art make use of hydrogen sulfide as a constituent of the sulfiding medium. However, at the elevated temperature employed in the prior art method, the complex of alumina, platinum chloride and hydroxyl groups is attacked to the extent that sulfur is actually incorporated into the structure, replacing at least a portion of the hydroxyl groups and/or the oxygen which forms the alumina. In addition, an analysis of the composite, following the sulfiding technique at the higher temperatures, by X-ray diffraction, indicates that the platinum crystal has been attacked to the extent of being converted to platinum sulfide.

The use of a strong mineral acid, such as sulfurous or concentrated sulfuric acid, tends to attack the structure by replacing at least a portion of the hydroxyl groups with sulfate. Also, the reduced platinum is open to partial oxidation to a sulfide or sulfate. Thus, the known methods of the prior art result in a catalytic structure entirely different from that of the present invention wherein the sulfur is merely adsorbed onto the reduced metallic component, either as elemental sulfur, or as hydrogen sulfide. By X-ray diffraction analysis, no change in the structure of the platinum crystal is observed. As hereinafter stated, the catalyst of the present invention yields unusual and unexpected results when employed in the reforming of hydrocarbons, and when compared directly to results obtained through the use of present-day composites.

The platinum-containing catalyst prepared as hereinabove described is superior to present-day reforming catalysts, in that the same can resist simultaneously three species of activity loss known to occur in catalytic reforming processes utilizing this type of catalyst. The unique feature of the catalyst of the present invention is believed to be the catalyst structure wherein the sulfur is present only as an adsorbed layer on the surface of high activity, reduced platinum. The unusually high activity of the catalyst of the present invention is unexpected since previous experience has indicated that a reduced platinum catalyst, having been sulfided prior to use, can be severely damaged during the initial start up of the process in which it is intended to be used. Furthermore, low activity and catalytic instability appear to occur if the sulfur exists within the composite in combination with the platinum as a sulfide or sub-sulfide, or if platinum sulfides are partially reduced to give metallic platinum on the surface and sulfur atoms or ions beneath the surface.

As hereinabove set forth, platinum-containing reforming catalysts generally experience three different modes of deactivation. First, there exists the deactivation resulting from excessive demethylation and hydrocracking prevalent when hot naphtha vapors initially contact the fresh catalyst. This particular type of deactivation results in excessive catalyst temperatures, low hydrogen purity, and a liquid product falling far short of the intended quality and quantity. Activity and stability loss, resulting from this mode of deactivation, has been shown to be prevented by allowing the platinum-containing catalyst to pick up some sulfur prior to contacting the hot naphtha vapors, or through the utilization of a sulfur-containing charge stock at relatively low temperatures. It has also been shown that this type of deactivation may be prevented where the catalyst contains sulfur in the form of sulfide or sulfate, and the catalyst is initially contacted with the charge stock at a relatively low temperature, and below that at which the operation is normally conducted.

A second type of deactivation occurs during the initial start-up of a catalytic reforming unit wherein a hydrogen-rich gas stream is circulated while the catalyst is being heated to the desired operating temperature prior to contacting the same with the hydrocarbon charge stock. Under these conditions, the catalyst becomes reduced, and, due to the fact that the hydrogen-rich gas stream contains significant quantities of carbon monoxide and that a significant amount of water exists within the system, the reduction is effected under "wet" conditions. It has been shown that a reduction effected under "wet" conditions, results in permanent damage to the activity and stability of the catalytic composite; furthermore, a significant quantity of metallic platinum, with sub-sulfides underneath, becomes part of the catalyst structure.

The third type of deactivation is due to the presence of sulfides and sub-sulfides in a reduced platinum catalyst which must be exposed to the air in shipping, storage, and loading prior to effecting the final reduction within the reforming system during the start-up thereof. This type of deactivation appears to prevent the simultaneous protection against deactivation of the two types hereinabove described and discussed. As hereinafter indicated in specific examples, this dilemma is avoided through the use of a catalytic composite upon which sulfur has been adsorbed at room temperature, following a substantially dry, hydrogen reducing technique at elevated temperature. The dilemma which is presented in attempting to protect a catalyst against deactivation resulting from the conditions prevailing in the start-up of a catalytic reforming process may be stated as follows: the catalyst must be pre-reduced in order to prevent deactivation from carbon monoxide and moisture existing within the reforming unit and the start-up hydrogen stream. The catalyst must contain sulfur to resist the deactivation resulting from excessive demethylation and hydrocracking when the fresh catalyst is initially contacted with the hot naphtha vapor. A catalyst containing sulfides or sub-sulfides for the latter protection will, if pre-reduced, suffer from the third type of deactivation.

The following examples are given to illustrate the method of preparing the catalyst of the present invention, and to indicate the unusual benefits afforded a process for the catalytic reforming of hydrocarbons and mixtures of hydrocarbons through the utilization of such a catalytic composite. It is not intended to limit unduly the catalytic composite, the method of manufacturing, or the reforming process by the reagents, concentrations and/or conditions of operation employed within the examples. The catalytic reforming process to which the catalyst of the present invention is particularly applicable, may be effected at a temperature within the range of from about 800° F. to about 1050° F., and under an imposed pressure within the range of from about 300 pounds per square inch to about 900 pounds per square inch, or more. The liquid hourly space velocity, defined as volumes of liquid hydrocarbon charge per hour, per volume of catalyst disposed within the reaction zone, will generally lie within the range of from about 0.5 to about 10.0. Lower space velocities are generally preferred, usually, however, in excess of about 0.5, having an upper limit of about 6.0. The resulting catalytically reformed product is passed into a separating zone for the purpose of removing a hydrogen-rich gaseous phase which is recycled to combine with the liquid hydrocarbon charge. This gaseous recycle is of an amount such that the mol ratio of hydrogen to hydrocarbons, entering the reforming reaction zone, is within the range of from about 2:1 to about 20:1.

EXAMPLE I

This example is presented for the purpose of illustrating the deactivation resulting from a stagnant "wet" reduction as experienced during the initial start-up of commercial catalytic reforming processes, and the elimination of the greater portion of this type of deactivation when the catalyst is pre-reduced under dry conditions, in accordance with the present invention, prior to the wet, stagnant reduction.

A catalyst was prepared utilizing $\frac{1}{16}$-inch alumina spheres, manufactured by the method detailed in U.S. Patent No. 2,620,314, issued to James Hoekstra, and containing 0.35% by weight of combined chloride. The spheres were intimately commingled with a sufficient quantity of an aqueous solution of hydrogen fluoride to combine therewith about 0.35% by weight of combined fluoride. The halide-containing spheres were then dried and subjected to a single calcination technique at a temperature of about 900° F. The calcined spheres were impregnated with an aqueous solution of chloroplatinic acid in an amount sufficient to yield a final catalyst containing 0.75% by weight of platinum, calculated as the element thereof. The impregnated spheres were dried at a temperature of about 300° F. and thereafter calcined, in an atmosphere of air, at a temperature of about 900° F. and for a period of about 2 hours until the volatile matter content of the composite was below a level of about 2.0% by weight. This catalyst exemplifies the present-day, reforming-type catalysts containing platinum and combined halogen composited with a refractory inorganic oxide. In the following discussion, and in Table I, this catalyst is designated as catalyst "A," and is employed for the purpose of evaluating a catalyst subjected to reduction as hereinafter set forth.

A second catalyst was prepared in the same manner as the above-described catalyst "A," and having the same concentration of catalytic components. However, this catalyst was given a stagnant, wet reduction as experienced in the start-up of a commercial catalytic reforming process. This catalyst is designated in Table I as catalyst "B." A third catalyst, prepared in accordance with the method previously described with respect to catalyst "A" was pre-reduced under dry conditions, and thereafter subjected to a stagnant, wet reduction as experienced in the commercial process. This catalyst is designated as catalyst "C" in Table I.

The three catalyst portions were subjected individually to a particular activity-stability test which comprises passing a hydrocarbon charge stock, having a boiling range from an initial boiling point of about 200° F. to an end boiling point of about 400° F., through the catalyst at a liquid hourly space velocity of 2.0, in an atmosphere of hydrogen present in a mol ratio of hydrogen to hydrocarbon of 14:1, for a period of about 14 hours. The reaction zone is maintained at a temperature of 932° F. at the inlet to the catalyst bed, and is under the imposed pressure of 500 pounds per square inch gauge maintained by compressive hydrogen recycle. The liquid product, from each reaction zone over the entire 14 hour period, is analyzed for its octane rating, F-1 Clear, in accordance with ASTM standard procedure. The results of this standard relative activity test procedure are given in the following Table I:

*Table I*

| Catalyst Designation | A | B | C |
|---|---|---|---|
| Octane Rating of Product, F-1 Clear | 94.7 | 91.3 | 94.3 |
| Excess Debutanizer Gas, s.c.f./bbl | 453 | 443 | 441 |
| Excess Receiver Gas, s.c.f./bbl | 824 | 656 | 806 |
| Total Excess Gas, s.c.f./bbl | 1,277 | 1,099 | 1,247 |
| Debutanizer Gas Ratio | .354 | .403 | .354 |
| Activity Ratings: | | | |
| Debutanizer Gas at Octane | 100 | 117 | 102 |
| Debutanizer Gas at Total Gas | 100 | 128 | 103 |
| Octane Rating, Space Velocity | 100 | 75 | 93 |

For the purpose of obtaining a clear understanding of the data in the above table, and of making a proper evaluation thereof, several definitions of the terms employed therein are presented following: the excess receiver gas is that quantity of gas over and above the amount required to maintain the desired pressure within the reaction zone. Analyses have indicated that this gas is, for all practical purposes, substantially pure hydrogen (approximately 90 to 95 mol percent throughout the 14-hour period of the activity test). The excess debutanizer gas is a gaseous product which is composed of light paraffins, methane, ethane, propane and butane, along with some hydrogen, and results primarily from the hydrocracking reactions being effected within the reaction zone. The debutanizer gas ratio is the ratio of the excess debutanizer gas to the total excess gas, and is indicative of the relative yield of desirable liquid product within the effluent from the reaction zone: it is, to a certain extent, an indication of the relative stability of the catalyst. The lower the debutanizer gas ratio, the more active the catalyst for the purpose of effecting the proper balance among the desired reactions of a successful catalytic reforming process, and at an operating severity lower than that required of a catalyst having a higher debutanizer gas ratio. Furthermore, the lower gas ratio is indicative of greater stability, or capability to function as desired over a greater period of time.

The activity ratings are computed on a comparative basis with respect to the standard catalyst, in this illustration exemplified by catalyst "A." The catalysts are first compared at identical octane ratings and total gas productions, the excess debutanizer gas being the characteristic evaluated. They are then compared at equivalent liquid hourly space velocities producing a given octane rating. In the former instances, the smaller the numbers, the greater the liquid yield of product at a given octane rating; in the latter instance, the larger the number, the more active the catalyst, or the same octane rating on the liquid product can be achieved at a higher liquid hourly space velocity. All the activity ratings may thus be employed to indicate the comparative stability of the catalyst with respect to the standard, and comprise an excellent manner by which to achieve a proper evaluation.

Referring now to the data presented in foregoing Table I, it should be noted that none of the three catalysts contained sulfur in any form. Catalyst "A" was finished with a high-temperature oxidation technique conducted in air, and was not subjected to a wet, stagnant reduction; catalyst "B" was given a wet hydrogen reduction in situ, prior to conducting the activity test; catalyst "C" was finished with a high-temperature, dry reduction, and was subjected to a wet, stagnant reduction in situ. The data presented clearly indicate the deactivation of a platinum-containing catalyst when the same is subjected to a stagnant, wet reduction. In comparing catalyst "A" and catalyst "B" (the wet-reducing catalyst), it is first noted that the latter resulted in a liquid product having a significantly less octane rating, accompanied by a significantly greater debutanizer gas ratio. Thus, without protection, a catalyst which is detrimentally affected through contact with hydrogen in the presence of moisture, produces a poorer quality liquid product at a lower volumetric yield. Furthermore, as indicated by the three activity ratings, catalyst "B" results in greater quantities of debutanizer gas when the process is operated to produce either the same octane rating, or the same total gas production. With respect to the octane rating-space velocity activity, it will be noted that the rate at which the charge stock contacts catalyst "B," that is, the liquid hourly space velocity, must necessarily be significantly less to produce the same quality product as when utilizing catalyst "A."

The results obtained with respect to catalyst "C" indicate the superiority of a catalyst which has been protected by a finishing step constituting dry pre-reduction, notwithstanding that the catalyst was subsequently subjected to a stagnant, "wet" reduction in situ. Although the activity, with respect to octane rating-space velocity, did not attain the degree resulting through the use of catalyst "A," it is greatly improved over the catalyst which was not protected against the detrimental effects of a stagnant, wet reduction. The slightly low activity of 93.0% is believed to be due to the loss of combined chloride from the catalyst during the stagnant, wet reduction; the chloride concentration decreased from 0.35% to about 0.22% by weight. However, it is noted that the debutanizer gas ratio is identical to that obtained with the standard catalyst, catalyst "A," and that the octane rating of the debutanized liquid product is virtually identical.

EXAMPLE II

For the purpose of this example, three additional catalysts were subjected to the relative activity test procedure hereinbefore described in the discussion attendant Example I. The results of the individual activity tests are given in the following Table II.

*Table II*

| Catalyst Designation | D | E | F |
|---|---|---|---|
| Octane Rating, F-1 Clear | 92.2 | 90.9 | 95.8 |
| Excess Debutanizer Gas, s.c.f./bbl | 526 | 573 | 479 |
| Excess Receiver Gas, s.c.f./bbl | 568 | 446 | 842 |
| Total Excess Gas, s.c.f./bbl | 1,094 | 1,019 | 1,321 |
| Debutanizer Gas Ratio | .481 | .573 | .362 |
| Activity Ratings: | | | |
| Debutanizer Gas at Octane | 126 | 144 | 99 |
| Debutanizer Gas at Total Gas | | | 99 |
| Octane Rating, Space Velocity | 80 | 73 | 106 |

The first catalyst, designated as catalyst "D," was prepared in the manner hereinbefore described with respect to catalyst "A," with, however one exception; following the high-temperature oxidation procedure, the temperature was decreased to a level of about 750° F. to about 800° F., and the oxidized catalyst was subjected to a sulfiding technique for the purpose of causing the platinum component to exist therein as a platinum sulfide. That this oxidized, and normally sulfided catalyst results in low activity and poor product distribution, is readily ascertained upon reference to Table II, and upon being compared to catalyst "A." The octane rating of the final debutanized liquid product has decreased to 92.2, the debutanizer gas ratio increased to 0.481 and the octane rating-space velocity activity decreased to about 80. It is further noted that there is no activity rating for the debutanizer gas at an equivalent total gas production; at a total gas production equivalent to that exhibited by catalyst "A," the excess debutanizer gas production resulting from the use of catalyst "D" was well off the chart employed in making this particular comparison.

That the poor degree of catalyst activity and stability is still present when at least a portion of the combined sulfur is removed by a hydrogen reduction, as would be experienced during the start-up of a commercial unit, is indicated by the results obtained on catalyst "E." In fact, it is readily noted that this catalyst is of significantly poorer quality than catalyst "D"; the debutanizer gas activity rating at an equivalent octane rating is significantly higher and the octane rating-space velocity activity is approximately 7% lower.

With reference now to the data obtained when catalyst "F" was subjected to the relative activity test, it is noted that all three activity ratings have improved substantially and the debutanizer gas ratio is approximately 25% lower. Catalyst "F" was prepared in accordance with the method of the present invention wherein the oxidized platinum-containing composite is pre-reduced under virtually dry conditions at a temperature of about 900° F. for a period of about one hour, and thereafter subjected to a sulfiding technique at room temperature of about 80° F., utilizing hydrogen sulfide to result in the physical adsorption of sulfur in an amount of about 0.10% by weight of the total composite.

EXAMPLE III

The catalysts employed in the relative activity tests illustrated in this example were prepared by initially forming an aluminum chloride hydrosol into 1/16-inch spheres by the oil-drop method set forth in U.S. Patent No. 2,620,314. The alumina spheres were dried at a temperature of about 400° F., and thereafter calcined, or oxidized, in an atmosphere of air, for a period of one hour at a temperature of 950° F. The calcination temperature was then increased to a level of 1265° F., and the calcination continued at this elevated temperature for a period of about two hours, until the volatile matter content of the alumina spheres had been decreased to a level of 1.98% by weight. The calcined alumina spheres were then commingled, in a rotating evaporator, with water, hydrochloric acid, and sufficient chloroplatinic acid to yield a catalyst containing 0.750% by weight of platinum calculated as the element. On the basis of about 600 pounds of the 1/16-inch calcined alumina spheres, 136 gallons of water and 34.6 pounds of a 34.6% by weight solution of hydrochloric acid were added to the rotating evaporator. The alumina spheres were dried within the rotating evaporator at a steam pressure of about 50 pounds, for a period of about six hours. The dried spheres were then subjected to high-temperature calcination, or oxidation, at a temperature of 550° F. for a period of one hour until the volatile matter content was 4.5% by weight. The oxidation temperature was then increased to a level of 932° F. and further calcination effected at the elevated temperature for a period of about two hours until the volatile matter content had decreased to a level of 1.7% by weight. The catalyst was fluoride-free, containing 0.750% by weight of platinum and 0.95% by weight of chloride, calculated as the element.

A portion of the oxidized catalyst was placed in an elongated vessel and was maintained at a temperature of about 900° F. while being contacted with a continuously circulating stream of about 95% hydrogen. After about one and one-half hours, the hydrogen circulation was stopped, residual hydrogen was purged from the vessel with nitrogen, and the temperature of the catalyst decreased to room temperature of about 100° F. When the effluent gas of the vessel indicated less than 2.0 mol percent hydrogen, hydrogen sulfide was introduced in an amount to yield a final catalyst having adsorbed 0.10% by weight of sulfur, believed, as hereinafter set forth, to exist as a monolayer on the surface of the reduced platinum.

With respect to the following Table III, the oxidized catalyst prepared in the absence of the pre-reduction at the elevated temperature, and without the sulfiding technique at about room temperature, is designated as catalyst "G." When subjected to a secondary evaluation text procedure (hereinafter described in detail), the testing technique involved a "wet-reduction" start-up simulating that which is experienced in commercial catalytic reforming processes. The catalyst designated as catalyst "H" was prepared in accordance with the preferred procedure of the present invention, including the high-temperature dry pre-reduction, and the room-temperature pre-sulfiding technique; this catalyst was subjected to the secondary evaluation test procedure under "dry" start-up conditions. The catalyst designated in the following Table III as catalyst "I" was likewise prepared in accordance with the method of the present invention, but was, however, subjected to the secondary evaluation test procedure in a manner similar to catalyst "G"; that is, under "wet-reduction" start-up conditions.

The secondary evaluation test procedure is designed to evaluate the stability of the catalyst over an extended period of time; this test procedure utilizes a light naphtha fraction having a boiling range from an initial boiling point of about 160° F. to an end boiling point of about 260° F., and is effected at conditions which are specifically chosen for the purpose of inducing a slight instability to the operation. Thus, the catalyst is maintained under an imposed hydrogen pressure of 300 pounds per square inch gauge, the charge being passed therethrough at the relatively low liquid hourly space velocity of 1.5 in the presence of hydrogen in a mol ratio of 12:1. The test procedure is effected for a period of approximately 150 hours or more, with continuous adjustment of the operating temperature to maintain an octane rating, on the debutanized liquid portion of the total product effluent, of 100.0 F–1 Clear. The various results are plotted against time in hours, and the relative activity and selectivity is determined by comparing the data to that resulting from other catalysts. The relative stability of the catalysts is determined by comparing the slope of the various plots at a processing time of 100 hours.

The results of the extended stability test (secondary evaluation test procedure) are presented in the following Table III:

Table III

| Catalyst Designation | G | H | I |
| --- | --- | --- | --- |
| Pentane and Heavier, Vol. percent | 51.0 | 64.6 | 64.2 |
| Excess Receiver Gas, s.c.f./bbl | 740 | 1,380 | 1,310 |
| Excess Debutanizer Gas, s.c.f./bbl | 695 | 320 | 350 |
| Total Excess Gas, s.c.f./bbl | 1,435 | 1,700 | 1,660 |
| Debutanizer Gas Ratio | 0.485 | 0.188 | 0.211 |
| Hydrogen in Recycle Gas, Mol percent | 44.0 | 72.5 | 71.9 |
| Change/Day at 100 Hours: | | | |
| Temperature, °F | 8.0 | 3.6 | 1.8 |
| Pentanes and Heavier, Vol. percent | −1.56 | −0.44 | −0.53 |
| Excess Receiver Gas, s.c.f./bbl | −110 | −15 | −24 |
| Excess Debutanizer gas, s.c.f./bbl | 75 | 10 | 7 |
| Total Excess Gas, s.c.f./bbl | −35 | −5 | −17 |

From the foregoing results, it is readily ascertained that the stability and selectivity of the catalyst designated as catalyst "G" (that catalyst not treated in accordance with the method of the present invention, and subjected to a "wet" start-up) has been severely adversely affected. The pentane-and-heavier liquid yield, the gas production, the hydrogen purity and the deactivation rates (indicated in Table III as the change per day at a processing time of 100 hours) are all definitely far inferior to those results obtained when testing the catalyst prepared in accordance with the method of the present invention, catalyst "H," which catalyst was subjected to the test procedure under "dry" start-up conditions. For example, the former catalyst indicated a deactivation rate of 8.0° F. per day (increasing temperature) to maintain 100.0 F-1 Clear octane rating; the catalyst prepared in accordance with the present invention required an increase in temperature of only 3.6° F. per day. Of further significance is the comparison of the pentane-and-heavier liquid product yields from catalysts "G" and "H"; this was about 13.0 volume percent higher utilizing the catalyst prepared in accordance with the present invention.

Catalyst "I" is that catalyst prepared in accordance with the present invention, being subjected, however, to the secondary evaluation test procedure under "wet" start-up conditions. It is evident, from the data presented in Table III that this catalyst withstood the severe wet hydrogen treatment with only very small selectivity losses. Of significantly greater interest, and a totally unexpected result, is that the data indicate a lower temperature deactivation rate for this catalyst than for the same catalyst subjected to "dry" start-up conditions.

In comparing other data with respect to catalysts "H" and "I," the protection afforded a platinum-containing reforming catalyst through the practice of the preparation method of the present invention, is shown to be extremely adequate. For example, there has been a slight decrease in the pentanes-and-heavier liquid product while producing the 100.0 octane rating, F-1 Clear; although the excess receiver gas decreased approximately nine standard cubic feet per barrel, the excess debutanizer gas decreased three standard cubic feet per barrel. For all practical purposes, the concentration of hydrogen in the recycle gas, computed as mol percent, was the same for both catalysts "H" and "I."

In brief summary, Example I clearly indicates the protection afforded a platinum-containing reforming catalyst, in regard to the deactivation resulting from the wet reduction experienced during the start-up of a commercial process, by "finishing" the catalyst with a high-temperature "dry" reduction in hydrogen. Example II illustrates the advantages of the room-temperature sulfiding technique over the high-temperature procedure (catalyst "D") employed in the prior art, and especially when a portion of the sulfur has been removed by a reducing medium. Example III has shown the unexpected degree of protection due to the combined effect of low-temperature sulfur adsorption following the "dry," high-temperature reduction. As hereinbefore set forth, the advantageous results are believed to be due to the physical adsorption of sulfur, perhaps as a mono-layer on the reduced platinum, as distinguished from chemically combined sulfur.

Other advantages afforded the catalytic reforming process, through the utilization of the catalyst prepared in accordance with the method of the present invention include the elimination of the necessity for utilizing extremely pure hydrogen (for example, electrolytic hydrogen) during the initial phase of the start-up; the catalyst can tolerate an impure hydrogen stream containing otherwise detrimental amounts of carbon monoxide. Furthermore, there exists no necessity for thoroughly and completely drying the unit prior to loading the catalyst therein.

The foregoing specification and examples clearly set forth the method employed in manufacturing a particular catalytic composite for utilization in a process for the catalytic reforming of hydrocarbons and mixtures thereof. The benefits afforded the reforming process are clearly ascertained from the data obtained as a result of the various activity testing procedures performed to compare the catalyst of the present invention with present-day catalyst.

I claim as my invention:

1. In a process for reforming hydrocarbons and mixtures of hydrocarbons, in which process a hydrocarbon charge stock is contacted with a catalytic composite of a noble metal from Group VIII of the Periodic Table, a refractory inorganic oxide and combined halogen, the improvement which comprises contacting said charge stock, at reforming conditions, with a catalytic composite of an alumina-containing refractory inorganic oxide, a reduced noble metal from Group VIII of the Periodic Table having sulfur adsorbed thereon and combined chlorine, said catalytic composite characterized by the method of manufacture comprising initially preparing a refractory inorganic oxide, combining chlorine therewith, impregnating said refractory inorganic oxide with a solution of a Group VIII noble metal compound, drying the resultant composite and oxidizing the dried composite at an elevated temperature above about 400° F. to oxidize said noble metal, reducing the oxidized composite with hydrogen at an elevated temperature above about 850° F., in the absence of sulfur and sulfur compounds, to reduce said noble metal, and thereafter treating said composite with hydrogen sulfide at a temperature below about 200° F., thereby only physically adsorbing sulfur onto the resulting reduced noble metal, the resulting composite being substantially free from chemically combined sulfur.

2. The improvement of claim 1 further characterized in that said noble metal is platinum.

3. The improvement of claim 1 further characterized in that said refractory inorganic oxide is alumina.

4. In a process for reforming hydrocarbons and mixtures of hydrocarbons, in which process a hydrocarbon charge stock is contacted with a catalytic composite of a noble metal from Group VIII of the Periodic Table, a refractory inorganic oxide and combined halogen, the improvement which comprises contacting said charge stock, at reforming conditions, with a catalytic composite of alumina, reduced platinum in an amount of from about 0.01% to about 2.0% by weight, and having sulfur adsorbed thereon, and combined chlorine in an amount of from about 0.75% to about 1.5% by weight, said catalytic composite characterized by the method of manufacture comprising initially preparing alumina, combining chlorine therewith, impregnating said alumina with a solution of a platinum compound, drying the resulting composite and oxidizing the dried composite at a temperature above about 400° F. to oxidize said platinum, reducing the oxidized composite in an atmosphere of substantially dry hydrogen at a temperature within the range of from about 850° F. to about 1050° F., in the absence of sulfur and sulfur compounds, to reduce said platinum; and thereafter treating said composite with hydrogen sulfide at a temperature below about 200° F., thereby only physically adsorbing sulfur onto the resulting reduced platinum, the resulting composite being substantially free from chemically combined sulfur.

5. The improvement of claim 4 further characterized in that said hydrogen sulfide treating is effected at a temperature within the range of from about 50° F. to about 200° F.

6. The improvement of claim 4 further characterized in that said sulfur is adsorbed in an amount of from about 0.05% to about 1.5% by weight.

7. A method of manufacturing a catalytic composite of a refractory inorganic oxide, a noble metal from Group VIII of the Periodic Table and combined chlorine, which comprises initially preparing a refractory inorganic oxide, combining chlorine therewith, impregnating said refractory inorganic oxide with a solution of a noble metal compound, drying the resulting composite and oxidizing the dried composite at an elevated temperature above about 400° F. to oxidize said noble metal; reducing the oxidized composite at a temperature within the range of from about 850° F. to about 1050° F., in the absence of sulfur and sulfur compounds, in a hydrogen atmosphere to reduce said noble metal; and thereafter treating said composite with hydrogen sulfide at a temperature of from about 50° F. to about 200° F., thereby only physically adsorbing sulfur onto the resulting reduced noble metal, the resulting composite being substantially free from chemically combined sulfur.

8. A catalyst prepared by the method of claim 7.

9. The method of claim 7 further characterized in that said noble metal is platinum.

10. A method of manufacturing a catalytic composite of alumina, from about 0.01% to about 2.0% by weight of platinum and from about 0.75% to about 1.5% by weight of combined chlorine, calculated as the element, which comprises initially preparing alumina, combining chlorine therewith, impregnating said alumina with a solution of a platinum compound, drying the resultant composite and oxidizing the dried composite at an elevated temperature above about 400° F. to oxidize said platinum; reducing the oxidized composite in an atmosphere of substantially dry hydrogen at a temperature within the range of from about 850° F. to about 1050° F., in the absence of sulfur and sulfur compounds, to reduce said platinum; and thereafter treating said composite with hydrogen sulfide at a temperature below about 200° F., thereby only physically adsorbing sulfur in an amount of from about 0.05% to about 0.15% by weight onto the resulting reduced platinum, the resulting composite being substantially free from chemically combined sulfur.

11. A hydrocarbon conversion catalyst prepared by oxidizing a composite of a refractory inorganic oxide, a noble metal from Group VIII and combined chlorine to oxidize said noble metal; subjecting the oxidized composite to a hydrogen reducing treatment, in the absence of sulfur and sulfur compounds, at a temperature of from 850° F. to about 1050° F. to reduce said noble metal; and thereafter treating said composite with hydrogen sulfide at a temperature below about 200° F., thereby only physically adsorbing sulfur onto the resulting reduced noble metal, the final composite being substantially free from chemically combined sulfur.

12. The hydrocarbon conversion catalyst of claim 11 further characterized in that said refractory inorganic oxide is alumina and said noble metal is platinum.

13. The hydrocarbon conversion catalyst of claim 11 further characterized in that said oxidized composite is subjected to said reducing treatment in an atmosphere of substantially dry hydrogen.

References Cited by the Examiner

UNITED STATES PATENTS

| 2,863,825 | 12/1958 | Engel | 252—439 |
| 2,939,847 | 6/1960 | Smith et al. | 252—439 |
| 3,173,857 | 3/1965 | Haensel | 208—139 |

FOREIGN PATENTS

| 657,565 | 9/1951 | Great Britain. |

DELBERT E. GANTZ, *Primary Examiner.*

H. LEVINE, *Assistant Examiner.*